(12) United States Patent
Halliday et al.

(10) Patent No.: US 8,893,090 B2
(45) Date of Patent: Nov. 18, 2014

(54) STEPPING OUT OF AN ASYNCHRONOUS METHOD INTO ITS CONTINUATION IN A DEBUGGER

(75) Inventors: Ian William James Halliday, Seattle, WA (US); Gregg Bernard Miskelly, Seattle, WA (US); Stephen H. Toub, Seattle, WA (US); Dmitry Lomov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 13/088,003

(22) Filed: Apr. 15, 2011

(65) Prior Publication Data
US 2012/0266144 A1 Oct. 18, 2012

(51) Int. Cl.
G06F 9/44 (2006.01)
G06F 11/36 (2006.01)

(52) U.S. Cl.
CPC .............. *G06F 11/3632* (2013.01); *G06F 8/00* (2013.01); *G06F 11/3664* (2013.01)
USPC ............................ 717/127; 717/124; 717/125

(58) Field of Classification Search
None
See application file for complete search history.

(56) References Cited

U.S. PATENT DOCUMENTS

| | | | |
|---|---|---|---|
| 5,748,963 A * | 5/1998 | Orr | 717/131 |
| 5,815,653 A | 9/1998 | You et al. | |
| 6,353,923 B1 | 3/2002 | Bogle | |
| 6,412,106 B1 | 6/2002 | Leask et al. | |
| 7,401,323 B2 | 7/2008 | Stall | |
| 7,634,759 B2 * | 12/2009 | Calsyn et al. | 717/124 |
| 7,836,430 B2 | 11/2010 | Shebs | |
| 8,019,075 B2 | 9/2011 | Mohammad et al. | |
| 8,079,019 B2 * | 12/2011 | Lindo et al. | 717/129 |
| 8,091,075 B2 * | 1/2012 | Bates et al. | 717/129 |
| 8,127,277 B2 * | 2/2012 | Albot et al. | 717/127 |
| 8,539,452 B2 * | 9/2013 | Chapman et al. | 717/127 |
| 2004/0168155 A1 | 8/2004 | O'Farrell et al. | |
| 2004/0205720 A1 * | 10/2004 | Hundt | 717/124 |
| 2005/0034024 A1 | 2/2005 | Alverson et al. | |
| 2006/0248512 A1 * | 11/2006 | Messmer et al. | 717/125 |
| 2006/0248514 A1 * | 11/2006 | Messmer et al. | 717/127 |
| 2007/0074166 A1 * | 3/2007 | Overturf et al. | 717/124 |
| 2007/0220490 A1 * | 9/2007 | Kobayashi et al. | 717/124 |

(Continued)

OTHER PUBLICATIONS

Marchetto et al., "State-Based Testing of Ajax Web Applications," 2008 International Conference on Software Testing, Verification, and Validation, pp. 121-130.*

(Continued)

*Primary Examiner* — Thuy Dao
*Assistant Examiner* — Stephen Berman
(74) *Attorney, Agent, or Firm* — Kevin Sullivan; Kate Drakos; Micky Minhas (57) ABSTRACT

Stepping out of an asynchronous process. A method includes, as part of a computer program execution, at a caller, making an asynchronous function call from the caller to a callee. Associated with the asynchronous function call a continuation waits for the completion of the callee with respect to the asynchronous function call. The method further includes correlating a debugging indicator to the callee indicating that a user wishes to step out of the caller when the callee returns. An indication of completion of the callee with respect to the asynchronous function call and that a user wishes to step from the callee to the continuation is received. The debugging indicator is referenced and based on the debugging indicator execution at entry into the continuation is stopped.

20 Claims, 3 Drawing Sheets

(56) References Cited

U.S. PATENT DOCUMENTS

| | | | |
|---|---|---|---|
| 2008/0052683 A1* | 2/2008 | Bates et al. | 717/129 |
| 2009/0125890 A1* | 5/2009 | Bennet et al. | 717/129 |
| 2009/0133033 A1* | 5/2009 | Lindo et al. | 718/108 |
| 2009/0307652 A1 | 12/2009 | Maybee et al. | |
| 2010/0131745 A1* | 5/2010 | Meijer et al. | 712/244 |
| 2010/0153927 A1 | 6/2010 | Stall et al. | |
| 2010/0313184 A1 | 12/2010 | Gustafsson et al. | |
| 2011/0209125 A1* | 8/2011 | Stone | 717/127 |
| 2011/0302454 A1* | 12/2011 | Prophete et al. | 714/38.1 |
| 2012/0047495 A1 | 2/2012 | Meijer et al. | |
| 2012/0151452 A1* | 6/2012 | Zinkovsky et al. | 717/129 |
| 2012/0246624 A1 | 9/2012 | Halliday et al. | |
| 2012/0266144 A1 | 10/2012 | Halliday et al. | |
| 2012/0324431 A1 | 12/2012 | Toub et al. | |
| 2013/0275950 A1* | 10/2013 | Dalcher | 717/125 |

OTHER PUBLICATIONS

Jhala et al., "Interprocedural analysis of asynchronous programs," 2007, POPL '07 Proceedings of the 34th annual ACM SIGPLAN-SIGACT symposium on Principles of programming languages, pp. 339-350.*

Lei et al., "Eæcient Reachability Testing of Asynchronous Message-Passing Programs," 2002, Proceedings of the Eighth IEEE international Conference on Engineering of Complex Computer Systems (ICECCS'02), pp. 1-10.*

Halliday, "What changes in debugging Async code?" Microsoft Visual Studio Blog, Retrieved Dec. 28, 2010, http://social.msdn.microsoft.com/Forums/en-US/async/thread/9d6508a5-bd0f-40df-93a3-49ddd69e5a39/.

Rossi, "ABAP Debugger," SAP Community Network Blog, Retrieved Dec. 28, 2010, http://wiki.sdn.sap.com/wiki/display/ABAP/ABAP+Debugger#ABAPDebugger-Howdoldebugrunningbackgroundprocessesorasynchronous processes°3F.

Vijayvargiya, "Writing Windows Debugger—Part 2," The Code Project, Retrieved Dec. 28, 2010, http://www.codeproject.com/KB/system/writing_debugger_2.aspx#CodeStepping.

Allen, "Visual Studio Debugging Tutorial," Dot Net Perls, Retrieved Dec. 28, 2010, http://www.dotnetperls.com/debugging.

Author Unknown, "Visual Studio 2010: Understanding Debugging," Programming 4Us, Retrieved Dec. 28, 2010, http://programming4.us/desktop/1466.aspx.

Toub, "Processing Sequences of Asynchronous Operations with Tasks", Nov. 21, 2010, 6 pages.

Lippert, Eric, "Asynchronous Programming in C# 5.0 Part Two: Whence Await?", Last Post Shown Oct. 30, 2010, 5 pages.

Moise, Wesner, Smart Software, "Building Iterators Using Asynchronous Methods", Nov. 2, 2010, 4 pages.

Sur, Abhishek, "C# 5.0 vNext—New Asynchronous Pattern", Nov. 20, 2010, 25 pages.

Juday, Jeffrey, "Awaiting Future C# Asynchronous Features Brought to You by .NET Parallel Computing", Dec. 7, 2010, 6 pages.

Toub, "Implementing the Asynchronous Programming Model With Future <T>", Last Post Apr. 14, 2008, 4 pages.

Matveev, Vladimir, "Event-Based Async Pattern in F#", 2010, 3 pages.

Krohn, Maxwell, et al., "Events Can Make Sense", Based on information and belief available, at least as early as Dec. 29, 2010, 14 pages.

Fernadez, et al., "Ddbx-LPP: A Dynamic Software Tool for Debugging Asynchronous Distributed Algorithms on Loosely—Coupled Parallel Processors", Retrieved at<< http://ieeexplore.ieee.org/stamp/stamp.jsp?arnumber=00169757>>, 1991, pp. 639-644.

Mitrovic, Vladimir, "Testing Asynchronous Code With GHUnit", Retrieved at<< http://vladimir.zardina.org/2010/11/testing-asynchronous-code-with-ghunit/>>, Nov. 20, 2010, p. 4.

Satyam, "Ask Satyam: Writing Clean, Debuggable Code", Retrieved at<<http://www.yuiblog.com/blog/2010/09/02/ask-satyam-writing-clean-code/>>, Sep. 2, 2010, p. 14.

Baechtel, Don, "What changes in debugging Async code", Retrieved at<< http://social.msdn.microsoft.com/Forums/en-US/async/thread/9d6508a5-bd0f-40df-93a3-49ddd69e5a39/>> , Nov. 2010, p. 5.

Griffiths, Ian, "C# 5 Async Exception Handling", Retrieved at<<http://www.interact-sw.co.uk/iangblog/2010/11/01/csharp5-async-exceptions>>, Nov. 1, 2010, p. 5.

Office Action, U.S. Appl. No. 13053228, filed Mar. 22, 2011, Notification Date: Jan. 31, 2013, 30 Pages.

Office Action, U.S. Appl. No. 13053228, filed Mar. 22, 2011, Notification Date: Jun. 26, 2013, 28 Pages.

Office Action, U.S. Appl. No. 13162288, filed Jun. 16, 2011, Notification Date: Oct. 9, 2013, 13 Pages.

* cited by examiner

STEPPING OUT OF AN ASYNCHRONOUS METHOD INTO ITS CONTINUATION IN A DEBUGGER

BACKGROUND

Background and Relevant Art

Computers and computing systems have affected nearly every aspect of modern living. Computers are generally involved in work, recreation, healthcare, transportation, entertainment, household management, etc.

Computers are generally controlled using application code run in a runtime that instructs processors how to perform functions and how to control other computer hardware. A computer developer creates software. However, when developing software, the software is rarely able to be developed with no errors. These errors may be a result of programmer error or problems with a software application having difficulties interacting with other applications or computer components.

To find errors in code, a developer can use a debugger. A debugger allows the developer to set breakpoints in the code such that when executing code encounters one of the break points, execution stops and the developer can determine the state of a system. The developer can use this state information to identify and correct code errors.

However, with asynchronous workflows in various programming languages, such as Visual F#, and the addition of asynchronous methods to various programming languages, such as Visual C# and Visual Basic, all available from Microsoft Corporation of Redmond Wash., stepping through code in a debugger can be unintuitive and difficult when stepping out of an asynchronous method/workflow. When the asynchronous method/workflow ends, it logically returns to the code that is waiting for it to complete, called the continuation, but this code is not on the call stack at the time the asynchronous method/workflow completes. As such, the debugger cannot naturally continue debugging at the continuation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment. The method includes acts for stepping out of an asynchronous process. The method includes, as part of a computer program execution, at a caller, making an asynchronous function call from the caller to a callee. Associated with the asynchronous function call a continuation waits for the completion of the callee with respect to the asynchronous function call. The method further includes correlating a debugging indicator to the callee indicating that a user wishes to step out of the caller when the callee returns. An indication of completion of the callee with respect to the asynchronous function call and that a user wishes to step from the callee to the continuation is received. The debugging indicator is referenced and based on the debugging indicator execution at entry into the continuation is stopped.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As noted above, when an asynchronous process ends, it logically returns to the code that is waiting for it to complete, called the continuation, but this code typically is not on the call stack at the time the asynchronous process completes. In such cases, a debugger cannot naturally continue debugging at the continuation. To do so the user would need to explicitly set a breakpoint at that code location of the continuation. It may not be the case that there is only a single possible continuation to run after a given asynchronous process completes so the user would have to set breakpoints at all possible locations. The user may not be able to find those locations or easily set breakpoints on them, however, and manually setting the breakpoints becomes a large burden on the user. In other scenarios, it is possible that the operation intended to run asynchronously happens to complete synchronously, which then means that the caller is still on the stack. However, debugging these scenarios have challenges as well. Thus, debugging asynchronous operations can be difficult.

Some embodiments illustrated herein remedy this by implementing a debugger that is able to automatically "step out" of an asynchronous process and continue stepping at the continuation. For example, in one embodiment, the compilers add information to the debugger configuration file that describes the source offsets where the asynchronous process is ending (e.g. a return statement). To then step out of an asynchronous process the debugger sets a flag on an object associated with the process when code execution gets to any of those specified offsets, and then continues the program's execution. The continuation that is waiting on the asynchronous process checks for this flag once it runs and knows that the process has completed. If the flag is set, (and in some embodiments other conditions are met), the continuation signals the debugger and the debugger then continues stepping from this point on. For example, in one embodiment, the continuation may call a special function that the debugger knows to break on.

Figure 1:
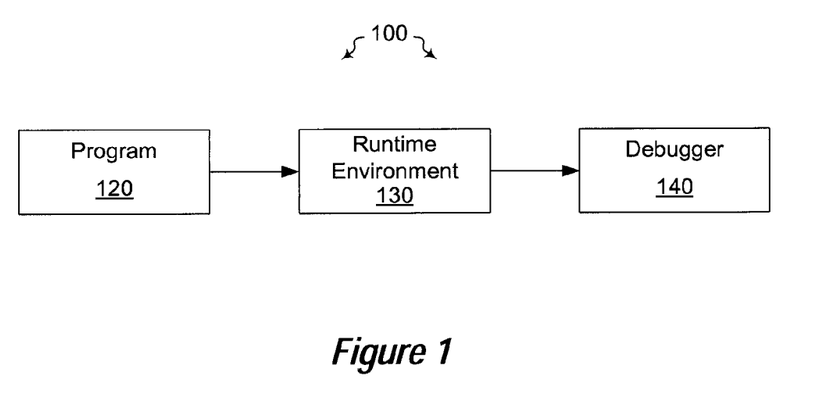
FIG. 1 illustrates a computer program implemented in a runtime environment and a debugger for debugging the program.

FIG. 1 is a block diagram of a debugging environment 100 in conjunction with which one or more of the described embodiments may be implemented. The debugging environment 100 can include a computer program 120 to be debugged. The program 120 can be submitted to a runtime environment 130, which can prepare the program 120 to be executed, and can execute the program 120 as directed by a debugger 140. The program 120 may be any of various different types of programs. For example, the program 120 may be in the form of source code, and the runtime environment 130 can include a compiler for compiling the code into executable form. As another example, the code of the program 120 may include one or more scripts, and the runtime environment 130 can include a translator for translating the scripts into executable form. As yet another example, the program 120 may be in an executable format, such as binary object code. Moreover, the program 120 may include combinations of such forms of code, or other forms of code that can be executed by a computing environment, possibly after being transformed in some manner (compiled, translated, etc.).

The debugger 140 can step through the code of the program 120, invoking the runtime environment 130 to run code in the program 120 between steps, and pausing at each step. For example, the debugger 140 may pause execution of the program 120 by the runtime environment 130 to allow for analysis of the runtime environment and/or to receive user input.

In doing such debugging, the debugger 140 may follow the physical flow or execution of the program 120. The debugger 140 can do this by stepping through the program 120 so that it appears to a user that the debugger 140 is following the path of the code portions that would be physically executing in the runtime environment 130 when running the program 120. Alternatively, the debugger 140 may follow a logical flow of the program 120. The debugger 140 can do this by stepping through the program 120 so that it appears to a user that the debugger 140 is following the path of logical flow of the program 120. For example, the debugger 140 may pause at areas that make it appear to the user that the debugger 140 is following a particular target process to its completion, even if an asynchronous wait operator would have returned physical execution to a process that called the target process before the target process was complete. Accordingly, the calling process and possibly other processes could be physically executing while the target process is in a waiting state (e.g., waiting for the callback for an asynchronous wait operator to be called). As noted above, embodiments may include functionality for stepping out of a called process to a debugger.

Figure 2A:
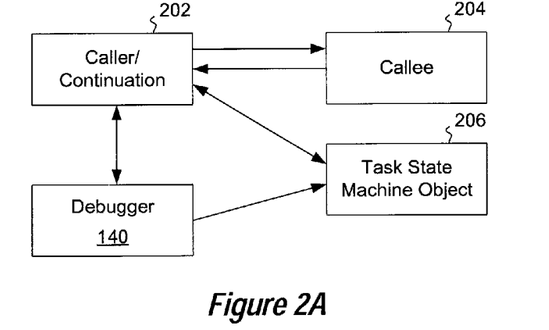
FIG. 2A illustrates an example of step-out functionality for an asynchronous process.

An example is illustrated in FIG. 2A. FIG. 2A illustrates a caller/continuation 202. The caller/continuation 202 may be, for example, an asynchronous process, such as a workflow or method. The caller/continuation 202 makes a call to a callee 204. The callee 204 may be, for example, an asynchronous process. The call to the callee 204 may expect processing to be returned to the caller/continuation 202 after the calle 204 has completed. In particular, a call to the callee may be associated with an await clause which causes the caller/continuation 202 to await completion of the callee 204 before some processing is continued.

Associated with the callee 204 is a task state machine object 206. The task state machine object 206 may, in some embodiments, be created in conjunction with the call the callee 204. The task state machine object 206 may serve as an object that is capable of storing information related to the callee 204 while the callee 204 is active and/or may help ensure that the callee 204 is able return data or processing to other computing entities appropriately. In some embodiments, a debugger 140 can set a debugging indicator, such as a breakpoint flag, on the task state machine object 206 that indicates that processing should step out from the callee 204, once the callee 204 has completed. This can be used to set a break point at the completion of the callee 204.

When the callee 204 has completed processing, the callee 204 will return to the caller/continuation 202. The caller/continuation 202 may be configured to check for the presence of the flag on the task state machine object 206 when processing returns to the caller/continuation 202. In some embodiments, the caller/continuation 202 (or other continuations illustrated in examples below) may be configured to check for the presence of the flag as a result of a compiler compiling code to have such functionality based on instructions from the debugger 140. In particular, the code may be instrumented to provide such functionality.

If the caller/continuation 202 detects that the breakpoint flag has been set on the task state machine object 206, the caller/continuation 202 stop processing and notifies the debugger 140. This can allow the debugger to facilitate debugging functionality.

There are other variations here. For example, consider the case where code does:

```
await Task.WhenAll(
    AsyncMethod1( ), AsyncMethod2( ));
```

The actual object being awaited is a proxy object that combines the two task state machine objects representing the actual asynchronous method calls. As such, the task state machine objects representing the asynchronous calls propagate their breakpoint flags to the proxy object representing the When All, so that when the await completes due to the When All completing, it will see the debugger breakpoint flag and be able to signal the debugger. However, in the meantime, the debugger may have cleared the bit on each of the asynchronous method task state machine objects (due, for example, to the debugger breaking somewhere else), and thus the await on the When All proxy object also checks whether any of the constituent task state machine objects still have their debugger breakpoint flag set, only breaking if one does.

In the preceding example, When All is just an example of a broader category of operations where one "proxy" object is used to represent another object that is the object actually representing the asynchronous method being stepped out of. The breakpoint flag is propagated from the actual object to the proxy object, and upon an await completing on the proxy object, it verifies that breaking should actually occur due to the actual object still having its debugger breakpoint flag set.

In general, embodiments may notify the debugger 140 that a continuation is no longer awaiting and code execution is at a place where the user wanted to step out of, and of a location where the debugger 140 should be breaking. The debugger 140, in some embodiments can validate that it should be breaking at the location. For example, the debugger 140 may be able to validate the location based on a debugger configuration file If the location is valid, the debugger 140 can step out of any system code to the extent that it exists to get back to user code awaiting the callee 204.

Figure 2B:
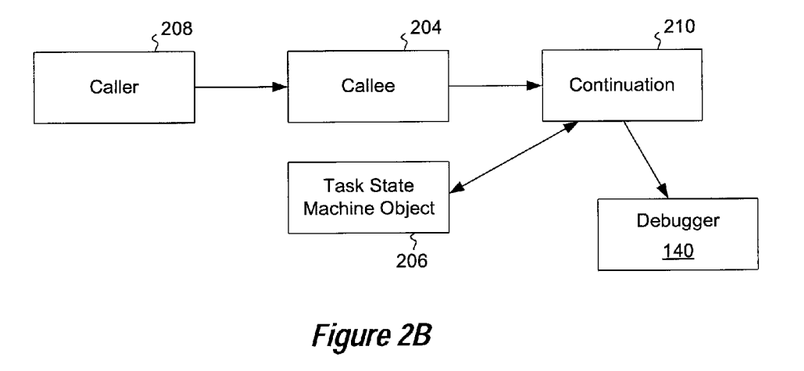
FIG. 2B illustrates another example of step-out functionality for an asynchronous process.

FIG. 2B illustrates an alternative embodiment, where a separate caller 208 and continuation 210 are illustrated. This example is similar to that illustrated in FIG. 2A, except that the caller 208 makes a call to the callee 204 and the continuation 210 waits for the callee 204 to return. When the callee 204 returns to the continuation 210, the continuation 210 can check the task state machine object 206 for the breakpoint flag. If the breakpoint flag is detected at the task state machine object 206, the debugger 140 can be notified as in the previous example.

Figure 2C:
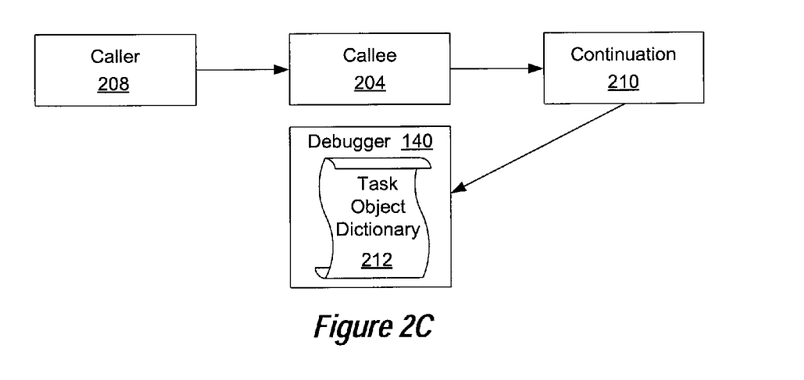
FIG. 2C illustrates another example of step-out functionality for an asynchronous process.

FIG. 2C illustrates yet another alternative embodiment. FIG. 2C illustrates that rather than using a flag on a task state machine object, a task object dictionary 212 can be used. In the illustrated example, the task object dictionary 212 is maintained by the debugger 140. The task object dictionary 212, in this example, includes a listing of asynchronous processes that the debugger would like to break on.

When the callee 204 returns to the continuation 210, the task object dictionary 212 can be used to determine if processing should break. For example, in some embodiments, the continuation 210 could compare an identifier for the callee 204 with identifiers stored in the task object dictionary 212. If the identifier for the callee 204 is in the task object dictionary 212, the continuation 210 could inform the debugger 140 of such conditions.

In an alternative embodiment, when the callee 204 returns, the continuation 210 could provide an identifier for the callee 204 to the debugger 140. The debugger 140 could use the task object dictionary 212 to determine if a processing break should occur. Thus, the debugger 140 could more directly cause processing to step out of the caller when the callee returns 204.

Various alternatives, though not shown in the Figures, could be used alternatively or additionally. For example, embodiments may be implemented where the task object dictionary 212 is implemented at a different location in a system than the debugger 140. In other embodiments, the debugger 140 may have other functionality for determining asynchronous processes that should be stepped out from, such that a continuation 210 could identify a callee 204 to the debugger 140, where the debugger 140 could then determine if the callee 204 should be stepped out of.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
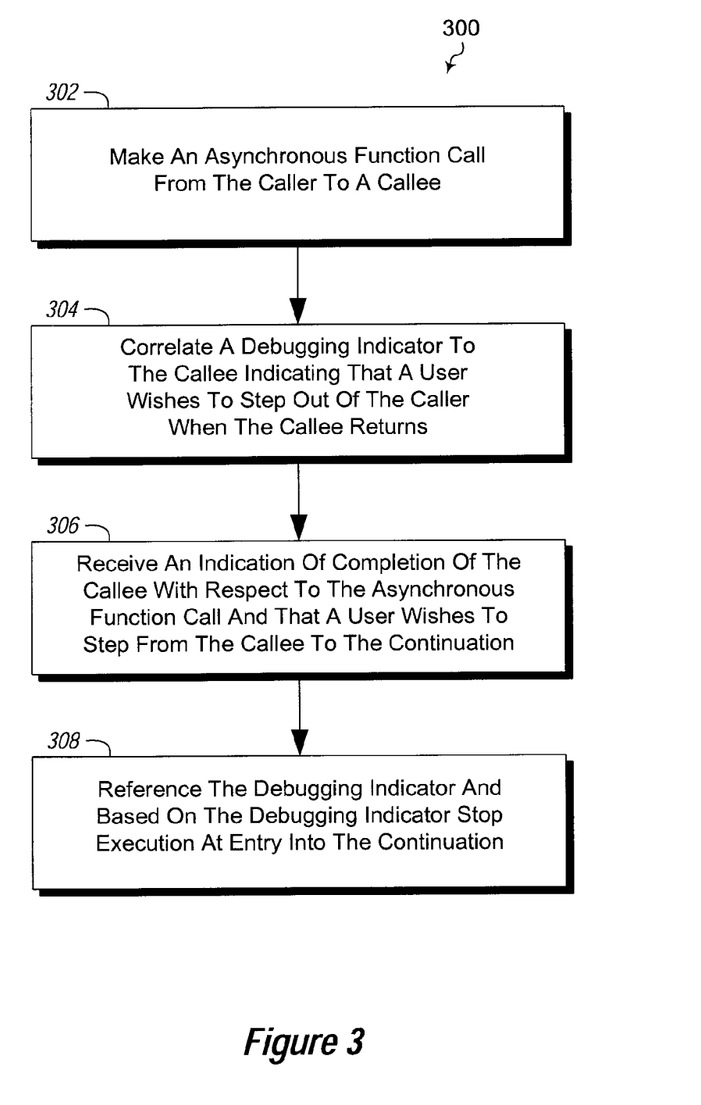
FIG. 3 illustrates a method of debugging an asynchronous process.

Referring now to FIG. 3, a method 300 is illustrated. The method 300 may be practiced in a computing environment and includes acts for stepping out of an asynchronous process. The method 300 includes as part of a computer program execution, at a caller, making an asynchronous function call from the caller to a callee (act 302). Associated with the asynchronous function call, a continuation waits for the completion of the callee with respect to the asynchronous function call. The act of calling a method and setting a continuation may be two separate operations. The asynchronous function can be called, and the act of calling it can return a handle to the ongoing asynchronous operation. At some later point in time, even after the asynchronous operation has completed, the continuation may be set onto that handle, and when that continuation then executes, the debugger should be able to step into it. For example a caller 208 (illustrated in FIG. 2B) may make an asynchronous function call to a callee 204 using an await clause causing the continuation 210 to wait for completion of the callee. While a clause is illustrated above, other embodiments may use other alternatives. For example, embodiments may use a library call, such as a ContinueWith method that accepts a representation of the continuation to run (e.g. a "delegate" to the target method).

The method 300 further includes correlating a debugging indicator to the callee indicating that a user wishes to step out of the caller when the callee returns (act 304). For example, as illustrated in FIGS. 2A-2C various indicators may be used. For example, in some embodiments, the debugging indicator is a breakpoint flag which in the illustrated example is a single bit flag. In some embodiments, the debugging indicator is stored in an asynchronous workflow state machine associated with the callee, such as for example, the task state machine object 206 illustrated in the Figures. In some embodiments, the debugging indicator is stored in a debugger tool, such as for example, stored with the debugger 140. In some embodiments, the debugging indicator is stored in in a dictionary list of asynchronous processes. For example, FIG. 3C illustrates a task object dictionary 212 where identifiers associated with asynchronous processes may be stored. As discussed previously, the dictionary may be stored in any of a number of locations, such as at the debugger, at a task state machine object, or some other appropriate location within a system.

The method 300 further includes receiving an indication of completion of the callee with respect to the asynchronous function call and that a user wishes to step from the callee to the continuation (act 306). For example, the continuation 210 may receive an indication that the callee has completed processing and wishes to return to the continuation 210.

The method 300 further includes referencing the debugging indicator and based on the debugging indicator stopping execution at entry into the continuation (act 308). For example, a flag, dictionary, or other indicator may be referenced and processing stopped as a result. Some embodiments may be implemented where referencing is performed by the continuation, the debugger, or a combination of the two. Embodiments may be implemented where stopping execution at entry into the continuation is based only in part on the debugging indicator. Other conditions may be involved as well. In particular, in some embodiments, execution will not be stopped unless the indicator is set, but just because the indicator is set does not mean execution will be stopped. Thus, embodiments where execution is stopped based on the debugging indicator may include embodiments where execution is stopped based, at least in part, on the debugging indicator.

The method 300 may be performed as part of a debugging process including receiving input indicating that an entity wishes to step from a callee to a continuation. For example, the entity may be a system developer using a debugger tool comprising step out functionality.

The method 300 may be performed where correlating a debugging indicator to the callee indicating that a user wishes to step out of the caller when the callee returns is based examination of a debugger configuration file.

In some embodiments, the acts of the method 300 are performed so long as execution has proceeded past a synchronous portion of the process. In particular, embodiments may be implemented where functions may include a portion of the function that is a synchronous portion where processing proceeding past the synchronous portion is performed to get to an asynchronous portion of the function. Embodiments may step into the function up to the synchronous portion, but not past into the asynchronous portion before stepping back out. However, various acts described in the method would not be performed unless processing proceeded to the asynchronous portion of the function.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer. Physical computer readable storage media exclude propagated signals.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method comprising:
   identifying a plurality of endpoints in a callee of a computer program, each of the endpoints being a point where execution of the callee ends, identifying the plurality of endpoints comprising generating identifiers for the plurality of endpoints;
   as part of executing the computer program, at a caller, making an asynchronous function call from the caller to the callee;
   recognizing that one of the identified endpoints has been reached in the program execution after making the asynchronous function call, the recognizing that the one of the identified endpoints has been reached being based at least in part on at least one of the generated identifiers for the plurality of endpoints;
   in response to recognizing that one of the identified endpoints has been reached in the program execution after the making of the asynchronous function call, performing the following:
      setting at least one of one or more debugging indicators, the at least one of the one or more debugging indicators being correlated to the callee to indicate that execution of the callee has reached at least one of the endpoints; and
      continuing the computer program execution;
   in response to the computer program execution reaching a continuation of the callee that is waiting for completion of the callee with respect to the asynchronous function call, determining that at least one of the one or more debugging indicators is set to indicate that execution of the callee has reached at least one of the endpoints; and stopping the program execution and stepping out of the program execution at entry into the continuation of the callee, the stopping of the program execution and the stepping out being performed in response to one or more determinations comprising the determination that at least one of the one or more debugging indicators is set to indicate that execution of the callee has reached at least one of the endpoints.

2. The computer-implemented method of claim 1, wherein the one of the identified endpoints is a return statement in the callee.

3. The computer-implemented method of claim 1, wherein the method is performed in response to receiving input indicating that an entity wishes to step from a callee to a continuation.

4. The computer-implemented method of claim 3, wherein the entity comprises a system developer using a debugger tool comprising step out functionality.

5. The computer-implemented method of claim 1, wherein the at least one of the one or more indicators comprises a single bit flag.

6. The computer-implemented method of claim 1, wherein the at least one of the one or more indicators is stored in a debugger tool.

7. The computer-implemented method of claim 1, wherein the at least one of the one or more indicators is stored in a list of asynchronous processes, the list of asynchronous processes including an identifier that identifies the callee.

8. The computer-implemented method of claim 1, wherein the identifiers for the plurality of endpoints are stored in a debugger configuration file, with each of the identifiers for the plurality of endpoints indicating a location of a corresponding one of the identified endpoints.

9. The computer-implemented method of claim 1, wherein the one or more determinations further comprises determining that the execution of the computer program has proceeded past an identified synchronous portion of the computer program.

10. One or more computer-readable memory comprising computer-readable instructions stored thereon that when executed perform acts comprising:

identifying one or more endpoints in a callee of a computer program, each of the one or more endpoints being a point where execution of the callee ends, identifying the one or more endpoints comprising storing one or more identifiers for the one or more endpoints;

as part of executing the computer program, at a caller, making an asynchronous function call from the caller to the callee;

recognizing that one of the one or more identified endpoints has been reached in the program execution after making the asynchronous function call, the recognizing that the one of the one or more identified endpoints has been reached being based at least in part on at least one of the one or more identifiers for the one or more endpoints;

in response to recognizing that one of the one or more identified endpoints has been reached in the program execution after the making of the asynchronous function call, performing the following:

setting at least one of one or more debugging indicators, the at least one of the one or more debugging indicators being correlated to the callee to indicate that execution of the callee has reached at least one of the one or more endpoints; and continuing the computer program execution;

in response to the computer program execution reaching a continuation of the callee that is waiting for completion of the callee with respect to the asynchronous function call, determining that at least one of the one or more debugging indicators is set to indicate that execution of the callee has reached at least one of the one or more endpoints; and stopping the program execution and stepping out of the program execution at entry into the continuation of the callee, the stopping of the program execution and the stepping out being performed in response to one or more determinations comprising the determination that at least one of the one or more debugging indicators is set to indicate that execution of the callee has reached at least one of the one or more endpoints.

11. The one or more computer-readable memory of claim 10, wherein the identifying of the one or more endpoints is performed by a compiler.

12. The one or more computer-readable memory of claim 10, wherein the at least one of the one or more debugging indicators is stored in an asynchronous workflow state machine object associated with the callee.

13. The one or more computer-readable memory of claim 10, wherein the at least one of the one or more indicators is stored in a debugger tool.

14. The one or more computer-readable memory of claim 10, wherein the at least one of the one or more indicators is stored in a list of asynchronous processes, the list of asynchronous processes including an identifier that identifies the callee.

15. The one or more computer-readable memory of claim 10, wherein the one or more identifiers for the one or more endpoints are stored in a debugger configuration file, with each of the one or more identifiers for the one or more endpoints indicating a location of a corresponding one of the one or more identified endpoints.

16. A computing system including functionality for stepping out of an asynchronous process, the computing system comprising:

one or more processors;

one or more computer readable media coupled to the one or more processors, wherein the one or more computer readable media comprise computer executable instructions stored thereon that when executed by one or more of the processors cause one or more of the processors to perform the following acts:

identifying a plurality of endpoints in a callee of a computer program, each of the endpoints being a point where execution of the callee ends, identifying the plurality of endpoints comprising generating identifiers for the plurality of endpoints, the identifiers for the plurality of endpoints each identifying a location of a corresponding on one of the plurality of endpoints;

as part of executing the computer program, at a caller, making an asynchronous function call from the caller to the callee;

recognizing that one of the identified endpoints has been reached in the program execution after making the asynchronous function call, the recognizing that the one of the identified endpoints has been reached being based at least in part on at least one of the generated identifiers for the plurality of endpoints;

in response to recognizing that one of the identified endpoints has been reached in the program execution after the making of the asynchronous function call, performing the following:

setting at least one of one or more debugging indicators, the at least one of the one or more debugging indicators being correlated to the callee to indicate that execution of the callee has reached at least one of the endpoints; and continuing the computer program execution;

in response to the computer program execution reaching a continuation of the callee that is waiting for completion of the callee with respect to the asynchronous function call, determining that at least one of the one or more debugging indicators is set to indicate that execution of the callee has reached at least one of the endpoints; and stopping the program execution and stepping out of the program execution at entry into the continuation of the callee, the stopping of the program execution and the stepping out being performed in response to one or more determinations comprising the determination that at least one of the one or more debugging indicators is set to indicate that execution of the callee has reached at least one of the endpoints.

17. The computing system of claim 16, wherein the at least one of the one or more indicators comprises a single bit flag.

18. The computing system of claim 16, wherein the at least one of the one or more indicators is stored in a debugger tool.

19. The computing system of claim 16, wherein the at least one of the one or more indicators is stored in a list of asynchronous processes, the list of asynchronous processes including an identifier that identifies the callee.

20. The computing system of claim 16, wherein the identifiers for the plurality of endpoints are stored in a debugger configuration file, with each of the identifiers for the plurality of endpoints indicating a location of a corresponding one of the identified endpoints.

* * * * *